United States Patent
Nam et al.

(10) Patent No.: US 10,787,534 B2
(45) Date of Patent: Sep. 29, 2020

(54) METHOD FOR PREPARING CORE-SHELL COPOLYMER, CORE-SHELL COPOLYMER AND RESIN COMPOSITION INCLUDING THE SAME

(71) Applicant: LG Chem, Ltd., Seoul (KR)

(72) Inventors: Sang Il Nam, Daejeon (KR); Yoon Ho Kim, Daejeon (KR); Kwang Jin Lee, Daejeon (KR); Kyung Bok Sun, Daejeon (KR); Chang No Lee, Daejeon (KR)

(73) Assignee: LG Chem, Ltd. (KR)

( * ) Notice: Subject to any disclaimer, the term of this patent is extended or adjusted under 35 U.S.C. 154(b) by 30 days.

(21) Appl. No.: 16/216,305

(22) Filed: Dec. 11, 2018

(65) Prior Publication Data

US 2019/0185605 A1    Jun. 20, 2019

(30) Foreign Application Priority Data

Dec. 18, 2017 (KR) .................. 10-2017-0173822

(51) Int. Cl.
| | |
|---|---|
| *C08F 279/02* | (2006.01) |
| *C08L 33/08* | (2006.01) |
| *C08L 27/06* | (2006.01) |
| *C08L 83/04* | (2006.01) |
| *C08L 33/10* | (2006.01) |
| *C08F 222/18* | (2006.01) |
| *C08L 9/06* | (2006.01) |
| *C08F 236/10* | (2006.01) |
| *C08K 5/14* | (2006.01) |

(52) U.S. Cl.
CPC .......... *C08F 279/02* (2013.01); *C08F 222/18* (2013.01); *C08F 236/10* (2013.01); *C08L 9/06* (2013.01); *C08L 27/06* (2013.01); *C08L 33/08* (2013.01); *C08L 33/10* (2013.01); *C08L 83/04* (2013.01); *C08K 5/14* (2013.01); *C08L 2207/53* (2013.01)

(58) Field of Classification Search
CPC .................................................. C08L 2207/53
See application file for complete search history.

(56) References Cited

U.S. PATENT DOCUMENTS

| | | | |
|---|---|---|---|
| 5,268,430 A | | 12/1993 | Wang |
| 5,523,365 A | * | 6/1996 | Geck .............. C08F 293/00 526/194 |
| 2005/0113525 A1 | | 5/2005 | Sosa et al. |
| 2007/0123657 A1 | | 5/2007 | Chai et al. |
| 2016/0108224 A1 | | 4/2016 | Seo et al. |
| 2017/0131002 A1 | | 5/2017 | Kopko |

FOREIGN PATENT DOCUMENTS

| | | |
|---|---|---|
| JP | S48030351 A | 4/1973 |
| JP | S58152039 A | 9/1983 |
| JP | H02191652 A | 7/1990 |
| JP | H05247148 A | 9/1993 |
| JP | 200325511 A | 1/2003 |
| JP | 2005042082 A | 2/2005 |
| JP | 2008520752 A | 6/2008 |
| KR | 19970021114 A | 5/1997 |
| KR | 20060120157 A | 11/2006 |
| KR | 20070037988 A | 4/2007 |
| KR | 20090120080 A | 11/2009 |
| KR | 20110109772 A | 10/2011 |
| KR | 20130078199 A | 7/2013 |
| KR | 20140118340 A | 10/2014 |
| KR | 20150004249 A | 1/2015 |
| KR | 20170012057 A | 2/2017 |

* cited by examiner

*Primary Examiner* — Jeffrey C Mullis
(74) *Attorney, Agent, or Firm* — Lerner, David, Littenberg, Krumholz & Mentlik, LLP

(57) ABSTRACT

A method for preparing a core-shell copolymer includes: preparing a core by polymerizing a conjugated diene-based monomer and adding an initiator including two or more peroxide-based functional groups when a polymerization conversion rate is 95% or more and less than 100%; and preparing a core-shell copolymer by polymerizing an alkyl (meth)acrylate monomer in the presence of the core and a macro initiator having a weight average molecular weight of 4,000 g/mol to 50,000 g/mol, wherein the initiator is added in an amount of more than 0 parts by weight and less than 2.5 parts by weight based on 100 parts by weight of the conjugated diene-based monomer, and the macro initiator is added in an amount of more than 0 parts by weight and less than 3.5 parts by weight based on 100 parts by weight of the alkyl (meth)acrylate monomer.

11 Claims, No Drawings

METHOD FOR PREPARING CORE-SHELL COPOLYMER, CORE-SHELL COPOLYMER AND RESIN COMPOSITION INCLUDING THE SAME

CROSS-REFERENCE TO RELATED APPLICATION(S)

This application claims benefit of priority to Korean Patent Application No. 10-2017-0173822 filed on Dec. 18, 2017 in the Korean Intellectual Property Office, the disclosure of which is incorporated herein by reference in its entirety.

BACKGROUND

1. Field

The present disclosure relates to a method for preparing a core-shell copolymer. More particularly, the present disclosure relates to a method for preparing a core-shell copolymer, a core-shell copolymer prepared therefrom, and a resin composition including the same.

2. Description of Related Art

A vinyl chloride-base resin has a variety of applications due to its low price and ease of hardness control, and is widely used in various fields because of its excellent physical and chemical properties.

However, the vinyl chloride-base resin has several disadvantages in terms of impact strength, processability, thermal stability, and thermal deformation temperature etc. Thus, in order to complement these disadvantages, additives such as an impact modifier, a processing aid, a stabilizer, a filler, etc. have been appropriately selected and used depending on its usage. Among them, a methyl methacrylate-butadiene-styrene-based terpolymer (hereinafter, referred to as an MBS copolymer) has been mainly used as the impact modifier for the vinyl chloride-based resin, and in particular, the amount of the MBS copolymer used is increasing in a molded article made of a transparent material using the vinyl chloride-based resin.

In the molded article made of a transparent material, haze property is important, along with impact strength. The impact strength and the haze property are in a trade-off relationship where haze property is deteriorated when impact strength is to be improved, and impact strength is deteriorated when haze property is to be improved, such that there is a limit in improving both of the impact strength and the haze property. Therefore, in the preparation of the molded article made of a transparent material using the vinyl chloride-base resin, there has been a continuous demand for developing a technique capable of improving both of the impact strength and the haze property.

RELATED ART DOCUMENT

[Patent Document]

(Patent Document 1) KR2009-0120080 A
(Patent Document 2) KR2011-0109772 A

SUMMARY

The problems to be solved in the present disclosure is to improve both of an impact strength and a haze property of a molded article prepared from a core-shell copolymer, when applying the core-shell copolymer as an impact modifier for a vinyl chloride resin.

That is, an object of the present disclosure is to provide a method for preparing a core-shell copolymer, which is the impact modifier, improving both of an impact strength and a haze property of the molded article and having excellent thermal stability thereof, when preparing the molded article from a resin composition including a vinyl chloride polymer and the impact modifier, a core-shell copolymer prepared therefrom, and a resin composition including the same.

In one aspect, a method for preparing a core-shell copolymer includes: preparing a core by polymerizing a conjugated diene-based monomer and adding an initiator including two or more peroxide-based functional groups when a polymerization conversion ratio is 95% or more and less than 100% (S10); and preparing a core-shell copolymer by polymerizing an alkyl (meth)acrylate monomer in the presence of the core prepared in (S10) and a macro initiator having a weight average molecular weight of 4,000 g/mol to 50,000 g/mol (S20), wherein the initiator including two or more peroxide-based functional groups is added in an amount of more than 0 parts by weight and less than 2.5 parts by weight, based on 100 parts by weight of the conjugated diene-based monomer, and the macro initiator is added in an amount of more than 0 parts by weight and less than 3.5 parts by weight, based on 100 parts by weight of the alkyl (meth)acrylate monomer.

In another general aspect, a core-shell copolymer includes a core including a conjugated diene-based monomer-derived repeating unit and an initiator-derived linking group including two or more peroxide-based functional groups; and a shell surrounding the core and including an alkyl (meth)acrylate monomer-derived repeating unit and a macro initiator-derived linking group having a weight average molecular weight of 4,000 g/mol to 50,000 g/mol, wherein the content of the initiator-derived linking group including two or more peroxide-based functional groups is more than 0 parts by weight and less than 2.5 parts by weight, based on 100 parts by weight of the conjugated diene-based monomer-derived repeating unit, and the content of the macro initiator-derived linking group is more than 0 parts by weight and less than 3.5 parts by weight, based on 100 parts by weight of the alkyl (meth)acrylate monomer-derived repeating unit.

In still another general aspect, a resin composition includes the core-shell copolymer and a vinyl chloride polymer.

DETAILED DESCRIPTION

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Hereinafter, the present disclosure will be described in more detail for assisting in the understanding of the present disclosure.

In the present disclosure, the term "core" is intended to complement the mechanical physical properties of the core-shell copolymer, and may refer to a polymer component or a copolymer component, in which the monomer forming the core is polymerized, or may refer to a rubber component, or a rubber polymer forming a core or a core layer of the core-shell copolymer.

In the present disclosure, the term "shell" may refer to a polymer component, or a copolymer component forming a shell or a shell layer of the core-shell copolymer, in which the shell surrounds the core, by graft polymerizing the monomer forming the shell on the core in the core-shell copolymer.

In the present disclosure, the term "a monomer-derived repeating unit" may refer to a component, a structure or a material itself derived from a monomer, or a repeating unit formed in the polymer by the added monomer participating in the polymerization reaction at the time of polymerization.

In the present disclosure, the term "an initiator-derived linking group" may refer to a component, a structure or a material itself derived from an initiator, and a linking group for bonding or coupling between the polymers by the added initiator participating in the bonding or coupling reaction between the polymers, during bonding or coupling between the polymers.

A method for preparing the core-shell copolymer according to the present disclosure may include preparing a core by polymerizing a conjugated diene-based monomer and adding an initiator including two or more peroxide-based functional groups when a polymerization conversion ratio is 95% or more and less than 100% (S10); and preparing a core-shell copolymer by polymerizing an alkyl (meth)acrylate monomer in the presence of the core prepared in (S10) and a macro initiator having a weight average molecular weight of 4,000 g/mol to 50,000 g/mol (S20), wherein the initiator including two or more peroxide-based functional groups may be added in an amount of more than 0 parts by weight and less than 2.5 parts by weight, based on 100 parts by weight of the conjugated diene-based monomer, and the macro initiator may be added in an amount of more than 0 parts by weight and less than 3.5 parts by weight, based on 100 parts by weight of the alkyl (meth)acrylate monomer.

According to an exemplary embodiment of the present disclosure, the method for preparing the core-shell copolymer may include polymerizing the core and the shell in stepwise by steps (S10) and (S20), wherein in step (S10), the core in the core-shell copolymer may be polymerized, and then, in step (S20), the shell may be polymerized on the core.

According to an exemplary embodiment of the present disclosure, step (S10) may be a step for preparing the core in the core-shell copolymer. According to the present disclosure, in a case where the core is prepared by polymerizing the conjugated diene-based monomer and adding an initiator including two or more peroxide-based functional groups when a polymerization conversion ratio is 95% or more and less than 100%, the initiator including two or more peroxide-based functional groups added when a polymerization conversion ratio is 95% or more and less than 100% participates in the polymerization reaction, such that each of two or more peroxide-based functional groups present in the initiator is bonded or coupled with the polymer component of the core formed by polymerization of the conjugated diene-based monomer, by a radical reaction, thereby improving both of an impact strength and a haze property of the core-shell copolymer. In the preparation of the core, in a case where the initiator including two or more peroxide-based functional groups is added when a polymerization conversion ratio is less than 95%, the initiator including two or more peroxide-based functional groups participates in the polymerization reaction itself to serve as a crosslinking agent to form a repeating unit in the core, whereby a haze property may be improved, but this may cause a rapid drop in impact strength; and in a case where the initiator including two or more peroxide-based functional groups is added when a polymerization conversion ratio is 100% or more, that is, after completion of the polymerization, improvement in an impact strength and a haze property may not reveal from the initiator including two or more peroxide-based functional groups.

According to an exemplary embodiment of the present disclosure, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein, halo means a halogen atom).

In addition, according to an exemplary embodiment of the present disclosure, the peroxide-based functional groups of the initiator including two or more peroxide-based functional groups each independently may include a substituent such as an alkyl group having a tertiary carbon atom, a cycloalkyl group, an alkenyl group, an alkynyl group or an aryl group, which may exhibit a resonance, a hyperconjugation, or a inductive effect on the peroxide-based functional group, so that the leaving of the leaving group may be easily performed during the radical reaction. As a specific example, each of the peroxide-based functional groups of the initiator including two or more peroxide-based functional groups may be substituted with a substituent such as an alkyl group having a tertiary carbon atom, a cycloalkyl group, an alkenyl group, an alkynyl group, or an aryl group in the peroxide-based functional group, and in this case, the reactivity may be improved.

In addition, according to an exemplary embodiment of the present disclosure, the initiator including two or more peroxide-based functional groups may be an initiator including two to four peroxide-based functional groups. As a more specific example, the initiator including two or more peroxide-based functional groups may be an initiator including four peroxide-based functional groups. In this case, an impact strength may be improved, without deteriorating an haze property of the molded article molded from the resin composition including the core-shell copolymer according to the present disclosure as an impact modifier. As a specific example, the initiator including two or more peroxide-based functional groups may be a LUPEROX® series, which is a peroxide-based family product, commercially available from ARKEMA. A more specific example may include LUPEROX® JWEB50 or LUPEROX® 101, and in this case, an impact strength is very excellent.

In addition, according to an exemplary embodiment of the present disclosure, the initiator including two or more peroxide-based functional groups may be added at a point of a polymerization conversion ratio of 95% or more and less than 100%, 95% to 99%, or 95% to 97%. In this case, when the shell is polymerized by attaching the initiator including two or more peroxide-based functional groups to the surface of the core, a grafting effect is maximized to widen the application range of the core, whereby a haze property as well as an impact strength revealing from the core may be significantly improved.

Further, according to an exemplary embodiment of the present disclosure, the initiator including two or more peroxide-based functional groups may be added in an amount of more than 0 parts by weight and less than 2.5 parts by weight, more than 0 parts by weight and equal to or less than 2 parts by weight, 0.5 parts by weight to 2 parts by weight, or 0.5 parts by weight to 1.5 parts by weight, based on 100 parts by weight of the conjugated diene-based monomer, and within these ranges, both of the impact strength and the haze property may be improved.

In addition, according to an exemplary embodiment of the present disclosure, step (S20) may be a step for preparing the shell of the core-shell copolymer. According to the present disclosure, when the core-shell copolymer is prepared by polymerizing an alkyl (meth)acrylate monomer in the presence of the core prepared in step (S10) and a macro initiator, the macro initiator participates in the polymerization reaction such that a macro initiator-derived repeating unit is included on the shell, whereby it is possible to improve an impact strength and a thermal stability of the molded article molded from the resin composition including the core-shell copolymer according to the present disclosure as an impact modifier. The macro initiator forms a block copolymer with the alkyl (meth)acrylate monomer having excellent compatibility with a vinyl chloride polymer, thereby improving an impact strength and a thermal stability.

According to an exemplary embodiment of the present disclosure, the alkyl (meth)acrylate monomer is a monomer for forming a shell of the core-shell copolymer and may be an alkyl (meth)acrylate monomer having 1 to 8 carbon atoms. The alkyl group having 1 to 8 carbon atoms in the alkyl (meth)acrylate having 1 to 8 carbon atoms may include all of a linear alkyl group having 1 to 8 carbon atoms, a branched alkyl group having 1 to 8 carbon atoms, and a cyclic alkyl group having 5 to 8 carbon atoms. As a specific example, the alkyl (meth)acrylate monomer having 1 to 8 carbon atoms may be methyl (meth)acrylate, ethyl (meth)acrylate, propyl (meth)acrylate, butyl (meth)acrylate, isobutyl (meth)acrylate, t-butyl (meth)acrylate, pentyl (meth)acrylate, hexyl (meth)acrylate, cyclohexyl (meth)acrylate, heptyl (meth)acrylate, octyl (meth)acrylate, or 2-etylhexyl (meth)acrylate. The alkyl (meth)acrylate monomer may refer to an alkyl acrylate monomer or an alkyl methacrylate monomer. As a more specific example, the alkyl (meth)acrylate monomer may be methyl methacrylate monomer, and in this case, a haze property may be excellent, while preventing an impact strength from being deteriorated.

In addition, according to an exemplary embodiment of the present disclosure, the macro initiator may have a weight average molecular weight of 4,000 g/mol to 50,000 g/mol, 5,000 g/mol to 45,000 g/mol, or 10,000 g/mol to 40,000 g/mol, and within these ranges, an impact strength, a haze property and a thermal stability may be all improved.

In addition, according to an exemplary embodiment of the present disclosure, the macro initiator may be a silicon azo-based macro initiator. As a specific example, the macro initiator may include both of silicon (Si) and an azo group. As described above, when the macro initiator including both of silicon and an azo group is used, silicon may induce to improve an impact strength and a thermal stability, and the azo group may induce improvement of compatibility with the vinyl chloride polymer since the azo group is easily copolymerized with the alkyl (meth)acrylate monomer to form a block copolymer. Therefore, it is possible to improve both of the impact strength and the thermal stability of the molded article formed from the resin composition including the core-shell copolymer polymerized using the macro initiator as an impact modifier.

According to an exemplary embodiment of the present disclosure, the macro initiator may be represented by the following Chemical Formula 1:

[Chemical Formula 1]

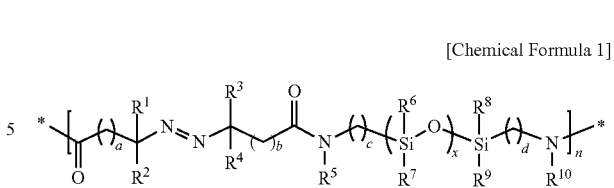

wherein, $R^1$ to $R^4$, and $R^6$ to $R^9$ may be each independently an alkyl group having 1 to 10 carbon atoms, or a cyano group, $R^5$ and $R^{10}$ may be each independently hydrogen or an alkyl group having 1 to 10 carbon atoms, a, b, c and d may be each independently an integer selected from 1 to 10, x may be an integer selected from 10 to 1,000, n may be an integer selected from 1 to 30, and * may be a bonding position between repeating units, but may be hydrogen at a terminal.

According to an exemplary embodiment of the present disclosure, in Chemical Formula 1, $R^1$ to $R^4$, and $R^6$ to $R^9$ may be each independently an alkyl group having 1 to 5 carbon atoms, or a cyano group, $R^5$ and $R^{10}$ may be each independently hydrogen or an alkyl group having 1 to 5 carbon atoms, a, b, c and d may be each independently an integer selected from 1 to 5, x may be an integer selected from 10 to 500, n may be an integer selected from 1 to 20, and * may be a bonding position between repeating units, but may be hydrogen at a terminal. As a specific example, in the Chemical Formula 1, $R^1$, $R^3$ and $R^6$ to $R^9$ may be each independently an alkyl group having 1 to 5 carbon atoms, $R^2$ and $R^4$ may be a cyano group, $R^5$ and $R^{10}$ may be hydrogen, a, b, c and d may be each independently an integer selected from 2 to 3, x may be an integer selected from 50 to 100, n may be an integer selected from 1 to 10, and * may be a bonding position between repeating units, but may be hydrogen at a terminal. When the macro initiator represented by Chemical Formula 1 is also added at the time of polymerization of the shell, an impact strength and a thermal stability may be significantly improved.

In addition, according to an exemplary embodiment of the present disclosure, the macro initiator represented by Chemical Formula 1 above may be a silicon azo-based macro initiator represented by the following Chemical Formula 2:

[Chemical Formula 2]

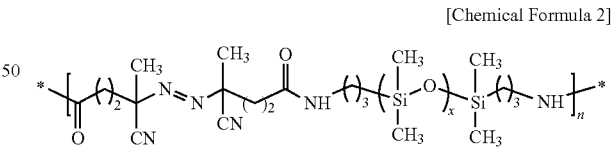

wherein, x may be an integer selected from 50 to 100, n may be an integer selected from 1 to 10, and * may be a bonding position between repeating units, but may be hydrogen at a terminal.

Further, according to an exemplary embodiment of the present disclosure, the macro initiator may be added in an amount of more than 0 parts by weight and less than 3.5 parts by weight, more than 0 parts by weight and equal to or less than 3 parts by weight, 0.5 parts by weight to 3 parts by weight, or 0.5 parts by weight to 2.5 parts by weight, based on 100 parts by weight of the alkyl (meth)acrylate monomer, and within these ranges, both of an impact strength and a haze property may be improved.

In addition, according to an exemplary embodiment of the present disclosure, the polymerization in steps (S10) and (S20) may be carried out by an emulsion polymerization, a bulk polymerization, a solution polymerization or a suspension polymerization, and as a specific example, may be carried out by a radical polymerization using a peroxide-based redox or azo-based initiator, in the presence of each monomer. In order to easily prepare the core-shell copolymer, the emulsion polymerization may be carried out and thus an emulsifier may be used therein. Further, the core and the core-shell copolymer prepared in steps (S10) and (S20) may be obtained in the form of a core latex and a core-shell copolymer latex, respectively, in which the core and the core-shell copolymer are dispersed in a solvent, and processes such as agglomeration, aging, dehydration, and drying may be carried out, in order to obtain a core-shell copolymer having a powder form from the core-shell copolymer.

Meanwhile, according to an exemplary embodiment of the present disclosure, the polymerization in step (S10) and the polymerization in step (S20) may be each independently carried out by further including an aromatic vinyl monomer, and as a specific example, both the polymerization in step (S10) and the polymerization in step (S20) may be carried out by further including an aromatic vinyl monomer. In this case, the monomer for forming the core may be a conjugated diene-based monomer and an aromatic vinyl monomer, and the monomer for forming the shell may be an alkyl (meth) acrylate monomer and an aromatic vinyl monomer. In this case, the core-shell copolymer having transparency through an adjustment of a refractive index of the core and the shell may be prepared.

According to an exemplary embodiment of the present disclosure, when the polymerization in step (S10) is carried out by further including an aromatic vinyl monomer, the content of an aromatic vinyl monomer may be 10 parts by weight to 200 parts by weight, 10 parts by weight to 100 parts by weight, or 20 parts by weight to 60 parts by weight, based on 100 parts by weight of the conjugated diene-based monomer, and within these ranges, an impact strength may be excellent, while maintaining transparency. In addition, the added content of the initiator including two or more peroxide-based functional groups described above may be the added content thereof based on 100 parts by weight of the total content of the conjugated diene-based monomer and the aromatic vinyl monomer, instead of 100 parts by weight of the conjugated diene-based monomer.

In addition, according to an exemplary embodiment of the present disclosure, when the polymerization in step (S20) is carried out by further including an aromatic vinyl monomer, the content of an aromatic vinyl monomer may be 50 parts by weight to 150 parts by weight, 70 parts by weight to 130 parts by weight, or 90 parts by weight to 110 parts by weight, based on 100 parts by weight of the alkyl (meth)acrylate monomer, and within these ranges, a haze property may be excellent, while maintaining transparency. In addition, the added content of the macro initiator described above may be the added content thereof based on 100 parts by weight of the total content of the alkyl (meth)acrylate monomer and the aromatic vinyl monomer, instead of 100 parts by weight of the alkyl (meth)acrylate monomer.

In addition, according to an exemplary embodiment of the present disclosure, the aromatic vinyl monomer capable of being added in steps (S10) and (S20) may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

In addition, according to an exemplary embodiment of the present disclosure, the core-shell copolymer prepared in step (S20) may include 50% by weight to 90% by weight, 50% by weight to 85% by weight, or 55% by weight to 85% by weight of the core; and 10% by weight to 50% by weight, 15% by weight to 50% by weight, or 15% by weight to 45% by weight of the shell, and within these ranges, it is possible to improve both of an impact strength and a haze property of the molded article formed from the resin composition including the core-shell copolymer as an impact modifier.

In addition, the present disclosure provides a core-shell copolymer prepared by the method for preparing a core-shell copolymer. The core-shell copolymer may include a core including a conjugated diene-based monomer-derived repeating unit and an initiator-derived linking group including two or more peroxide-based functional groups; and a shell surrounding the core and including an alkyl (meth)acrylate monomer-derived repeating unit and a macro initiator-derived linking group, wherein the content of the initiator-derived linking group including two or more peroxide-based functional groups is more than 0 parts by weight and less than 2.5 parts by weight, based on 100 parts by weight of the conjugated diene-based monomer-derived repeating unit, and the content of the macro initiator-derived linking group is more than 0 parts by weight and less than 3.5 parts by weight, based on 100 parts by weight of the alkyl (meth)acrylate monomer-derived repeating unit.

According to an exemplary embodiment of the present disclosure, the shell may be graft-polymerized on the core to include an alkyl (meth)acrylate monomer-derived repeating unit and a macro initiator-derived linking group. As a specific example, the shell may be graft-polymerized on the core and the macro initiator-derived linking group may form a block in the shell to have a block copolymer together with the alkyl (meth)acrylate monomer-derived repeating unit.

According to an exemplary embodiment of the present disclosure, the core and the shell each independently may further include an aromatic vinyl monomer-derived repeating unit, and as a specific example, the core and the shell may further include the aromatic vinyl monomer-derived repeating unit simultaneously.

In addition, according to an exemplary embodiment of the present disclosure, when the shell further includes the aromatic vinyl monomer-derived repeating unit, the shell may include a first shell including the alkyl (meth)acrylate monomer-derived repeating unit and the macro initiator-derived linking group, and a second shell including the aromatic vinyl monomer-derived repeating unit, and this case, the compatibility with the core is maximized from the first shell and the compatibility with the matrix resin is maximized from the second shell to improve the processability of the resin composition including the core-shell copolymer as an impact modifier. Accordingly, both of the impact strength and the haze property of the molded article formed therefrom may be excellent.

According to an exemplary embodiment of the present disclosure, each monomer-derived repeating unit and each initiator-derived linking group of the core-shell copolymer may be derived from the monomer and the initiator described above, respectively. Each monomer and each initiator for forming each monomer-derived repeating unit and each initiator-derived linking group may be the same as the type of the monomer and the initiator described above, respectively, and the content of each monomer-derived repeating unit and each initiator-derived linking group may be the same as the added content of each monomer and each initiator described above.

The resin composition according to the present disclosure may include the core-shell copolymer and the vinyl chloride polymer. That is, the resin composition may be a vinyl chloride-base resin composition.

According to an exemplary embodiment of the present disclosure, the resin composition may include 1 part by weight to 15 parts by weight, 3 parts by weight to 10 parts by weight, or 5 parts by weight to 10 parts by weight of the core-shell copolymer, based on 100 parts by weight of the vinyl chloride polymer, and within these ranges, both of the impact strength and the haze property of the molded article formed from the resin composition may be excellent.

The resin composition according to the present disclosure may further include additives such as a stabilizer, a processing aid, a heat stabilizer, a lubricant, a pigment, a dye, and an antioxidant, etc. within the range not deteriorating the physical properties, in addition to the vinyl chloride polymer and core-shell copolymer, if necessary.

In addition, according to an exemplary embodiment of the present disclosure, the resin composition may include the vinyl chloride polymer in the form of a master batch prepared by pre-mixing the vinyl chloride polymer with the various additives.

Hereinafter, the present disclosure will be described in detail by the Examples. However, the following Examples are provided for illustrating the present disclosure. It is apparent to a person skilled in the art that various modifications and alterations may be made without departing from the scope and spirit of the present disclosure, and the scope of the present disclosure is not limited thereto.

EXAMPLES

Example 1

<Preparation of Core Latex>

To a 120 L high-pressure polymerization vessel equipped with a stirrer, 150 parts by weight of ion-exchanged water, 0.5 parts by weight of sodium sulfate as an additive, 2.0 parts by weight of potassium oleate, 0.0047 parts by weight of ethylenediamine tetrasodium acetate, 0.003 parts by weight of ferrous sulfate, 0.02 parts by weight of sodium formaldehyde sulfoxylate, and 0.1 parts by weight of diisopropylbenzene hydroperoxide were initially charged. 100 parts by weight of a monomer mixture composed of 70% by weight of 1,3-butadiene and 30% by weight of styrene and 0.5 parts by weight of divinylbenzene were added thereto, the obtained mixture was polymerized at 50° C. for 18 hours, and 1.0 part by weight of LUPEROX® JWEB50 (manufactured by Arkema) was added when a polymerization conversion ratio is 95%. Subsequently, when a final polymerization conversion ratio is 98%, the polymerization was completed to obtain core latex. In this case, the core particles in the core latex had an average particle diameter of 100 nm.

<Preparation of Core-Shell Copolymer Latex>

70 parts by weight (based on solids) of the obtained core latex was added to a closed reactor and the reactor was charged with nitrogen. And then, 0.0094 parts by weight of ethylenediamine tetrasodium acetate, 0.006 parts by weight of ferrous sulfate, and 0.04 parts by weight of sodium formaldehyde sulfoxylate were added thereto, 15 parts by weight of methyl methacrylate, 0.15 parts by weight of potassium oleate, 15 parts by weight of ion-exchanged water, 0.64 parts by weight of sodium sulfate and 1.5 parts by weight of a silicon azo-based macro initiator represented by the following Chemical Formula 2 and having a weight average molecular weight of 10,000 g/mol were added over a period of 10 minutes, and polymerization was carried out at 50° C. for 1 hour. Then, 15 parts by weight of styrene, 0.0094 parts by weight of ethylenediamine tetrasodium acetate, 0.006 parts by weight of ferrous sulfate, 0.04 parts by weight of sodium formaldehyde sulfoxylate, 0.15 parts by weight of potassium oleate and 15 parts by weight of ion exchange water were added, followed by the polymerization at 50° C. for 2 hours. Subsequently, when a final polymerization conversion ratio is 98%, the polymerization was completed to obtain core-shell copolymer latex. In this case, the core-shell copolymer particles in the core-shell copolymer latex had an average particle diameter of 200 nm.

[Chemical Formula 2]

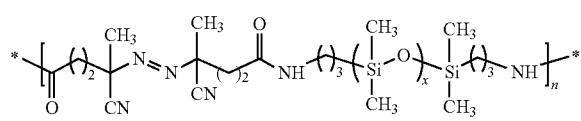

Wherein, x is an integer selected from 50 to 100, n is an integer selected from 1 to 10, and * may be a bonding position between repeating units, but may be hydrogen at a terminal.

<Preparation of Core-Shell Copolymer Powder>

0.5 parts by weight of antioxidants (IR-245) was added to 100 parts by weight (based on solids) of the obtained core-shell copolymer latex, coagulated by adding an aqueous sulfuric acid solution, followed by the separation of the core-shell copolymer from water at 80° C., and then dehydrated and dried to obtain a core-shell copolymer powder.

Example 2

The process was performed in the same manner as that in Example 1, except that in the preparation of the core latex, LUPEROX® JWEB50 was added in an amount of 1.5 parts by weight instead of 1.0 part by weight, and in the preparation of the core-shell copolymer latex, the silicon azo-based macro initiator represented by the Chemical Formula 2 and having a weight average molecular weight of 10,000 g/mol was added in an amount of 2.5 parts by weight instead of 1.5 parts by weight.

Example 3

The process was performed in the same manner as that in Example 1, except that in the preparation of the core latex, LUPEROX® JWEB50 was added in an amount of 0.5 parts by weight instead of 1.0 part by weight, and in the preparation of the core-shell copolymer latex, the silicon azo-based macro initiator represented by the Chemical Formula 2 and having a weight average molecular weight of 10,000 g/mol was added in an amount of 0.5 parts by weight instead of 1.5 parts by weight.

Example 4

The process was performed in the same manner as that in Example 1, except that in the preparation of the core latex, LUPEROX® JWEB50 was added in an amount of 2.0 parts by weight instead of 1.0 part by weight, and in the preparation of the core-shell copolymer latex, the silicon azo-based macro initiator represented by the Chemical Formula 2 and having a weight average molecular weight of 10,000 g/mol was added in an amount of 3.0 parts by weight instead of 1.5 parts by weight.

Example 5

The process was performed in the same manner as that in Example 1, except that in the preparation of the core latex, 2.0 parts by weight of LUPEROX® 101 (manufactured by Arkema) was added instead of 1.0 part by weight of LUPEROX® JWEB50, and in the preparation of the core-shell copolymer latex, the silicon azo-based macro initiator represented by the Chemical Formula 2 and having a weight average molecular weight of 10,000 g/mol was added in an amount of 3.0 parts by weight instead of 1.5 parts by weight.

Example 6

The process was performed in the same manner as that in Example 1, except that in the preparation of the core latex, 1 part by weight of LUPEROX® JWEB50 (manufactured by Arkema) was added when a polymerization conversion ratio is 97% instead of 95%.

Example 7

The process was performed in the same manner as that in Example 1, except that in the preparation of the core-shell copolymer latex, 1.5 parts by weight of the silicon azo-based macro initiator represented by the Chemical formula 2 and having a weight average molecular weight of 20,000 g/mol was added instead of 1.5 parts by weight of the silicon azo-based macro initiator represented by the Chemical formula 2 and having a weight average molecular weight of 10,000 g/mol.

Comparative Example 1

The process was performed in the same manner as that in Example 1, except that in the preparation of the core latex, LUPEROX® JWEB50 was not added, and in the preparation of the core-shell copolymer latex, the silicon azo-based macro initiator represented by the Chemical formula 2 and having a weight average molecular weight of 10,000 g/mol was not added.

Comparative Example 2

The process was performed in the same manner as that in Example 1, except that in the preparation of the core-shell copolymer latex, the silicon azo-based macro initiator represented by the Chemical formula 2 and having a weight average molecular weight of 10,000 g/mol was not added.

Comparative Example 3

The process was performed in the same manner as that in Example 1, except that in the preparation of the core latex, LUPEROX® JWEB50 was not added.

Comparative Example 4

The process was performed in the same manner as that in Example 1, except that in the preparation of the core-shell copolymer latex, the silicon azo-based macro initiator represented by the Chemical Formula 2 and having a weight average molecular weight of 10,000 g/mol was added in an amount of 3.5 parts by weight instead of 1.5 parts by weight.

Comparative Example 5

The process was performed in the same manner as that in Example 1, except that in the preparation of the core latex, LUPEROX® JWEB50 was added in an amount of 2.5 parts by weight instead of 1.0 part by weight.

Comparative Example 6

The process was performed in the same manner as that in Example 1, except that in the preparation of the core-shell copolymer latex, the core latex was added in an amount of 75 parts by weight (based on solids) instead of 70 parts by weight (based on solids), methyl methacrylate was added in an amount of 12.5 parts by weight instead of 15 parts by weight, and styrene was added in an amount of 12.5 parts by weight instead of 15 parts by weight.

Comparative Example 7

The process was performed in the same manner as that in Example 1, except that in the preparation of the core latex, 1 part by weight of LUPEROX® JWEB50 (manufactured by Arkema) was added when a polymerization conversion ratio is 70%, instead of 95%.

Comparative Example 8

The process was performed in the same manner as that in Example 1, except that in the preparation of the core latex, 1 part by weight of LUPEROX® JWEB50 (manufactured by Arkema) was added when a polymerization conversion ratio is 100%, instead of 95%.

Comparative Example 9

The process was performed in the same manner as that in Example 1, except that in the preparation of the core-shell copolymer latex, 1.5 parts by weight of the silicon azo-based macro initiator represented by the Chemical formula 2 and having a weight average molecular weight of 55,000 g/mol was added instead of 1.5 parts by weight of the silicon azo-based macro initiator represented by the Chemical formula 2 and having a weight average molecular weight of 10,000 g/mol.

Experimental Example

In order to evaluate the physical properties of the resin composition including the core-shell copolymer prepared in Examples 1 to 7 and Comparative Examples 1 to 9 as an impact modifier, the specimen was prepared as follows, the physical properties of the specimen were measured by the following methods, and the compositions of the respective core-shell copolymers were also shown in Tables 1 and 2 below.

1) Preparation of Resin Composition Specimen 100 parts by weight of the vinyl chloride polymer (manufactured by LG Chem. Ltd., product name LS080), 1.5 parts by weight of a heat stabilizer (tin stearate), 1.0 part by weight of an internal lubricant (potassium stearate), 0.3 parts by weight of external lubricant (paraffin wax), 0.5 parts by weight of a processing aid (manufactured by LG Chem. Ltd., product name PA-910), and 0.5 parts by weight of a pigment were sufficiently mixed at a temperature of 130° C. using a high-speed stirrer, and then cooled to prepare a vinyl chloride polymer master batch. 7 parts by weight of each of the core-shell copolymer powder prepared in Examples 1 to 7 and Comparative Examples 1 to 9 was added to the prepared vinyl chloride polymer master batch to prepare a sheet having a thickness of 0.6 mm using a two-roll mill at 195° C.

2) Impact Strength

The prepared resin composition specimen having a thickness of 0.6 mm was cut into a size of 10 cm (width)×14 cm (length) and aged at 25° C. for 2 hours. Then, an RPM at which the specimen is broken by 50% at the time of being brought into contact with the circular saw blade at a speed of 15 mm/sec while rotating the circular saw blade was measured. In this case, the higher the RPM, the better the impact strength.

3) Transparency

The prepared resin composition specimen having a thickness of 0.6 mm was cut into a size of 10 cm (width)×14 cm (length) and transmittance was measured using a haze meter (manufactured by Suga) instrument.

4) Haze Property

The prepared resin composition specimen having a thickness of 0.6 mm was cut into a size of 20 cm (width)×3 cm (length) and stretched 2 cm using a tensile machine Z010 (manufactured by Zwic), and then the haze of the stretched portion was measured using a haze meter (manufactured by Suga) instrument. In this case, the smaller the haze value, the better the haze property.

5) Thermal Stability

In 1) preparation of the resin composition specimen above, 20 parts by weight of the core-shell copolymer powder was added to the prepared master batch, and then kneaded at a room temperature, processed using a two-roll mill at 195° C. under conditions of a roll interval of 0.3 mm for 10 minutes to evaluate the thermal stability, and measured yellowing index (YI) value using a color meter, Ultra Scan pro. $\Delta YI$ was calculated according to the following Equation 1:

$$\Delta YI = YI \text{ value of the specimen processed for 10 minutes} - YI \text{ value of the specimen processed for 3 minutes} \quad \text{[Equation 1]}$$

TABLE 1

| Classification | | Example | | | | | | |
|---|---|---|---|---|---|---|---|---|
| | | 1 | 2 | 3 | 4 | 5 | 6 | 7 |
| Core | BD[1] | 70 | 70 | 70 | 70 | 70 | 70 | 70 |
| | SM[2] | 30 | 30 | 30 | 30 | 30 | 30 | 30 |
| | JWEB50[3] | 1.0 | 1.5 | 0.5 | 2.0 | — | 1.0 | 1.0 |
| | 101[4] | — | — | — | — | 2.0 | — | — |
| Core-shell copolymer | Core | 70 | 70 | 70 | 70 | 70 | 70 | 70 |
| | MMA[5] | 15 | 15 | 15 | 15 | 15 | 15 | 15 |
| | SM[2] | 15 | 15 | 15 | 15 | 15 | 15 | 15 |
| | SAM[6] | 1.5 | 2.5 | 0.5 | 3.0 | 1.5 | 1.5 | 1.5 |
| Impact strength | (rpm) | 800 | 805 | 775 | 810 | 790 | 795 | 800 |
| Transmittance | (%) | 89 | 88 | 89 | 87 | 89 | 89 | 88 |
| Haze | (%) | 20.0 | 19.0 | 24.0 | 18.0 | 22.0 | 21 | 19 |
| Thermal stability | $\Delta YI$ | 14 | 13 | 19 | 14 | 15 | 14 | 13 |

[1] BD: 1,3-butadiene (% by weight)
[2] SM: styrene (% by weight)
[3] JWEB50: LUPEROX ® JWEB50 (parts by weight)
[4] 101: LUPEROX ® 101 (parts by weight)
[5] MMA: methyl methacrylate
[6] SAM: silicon azo-based macro initiator

TABLE 2

| Classification | | Comparative Example | | | | | | | | |
|---|---|---|---|---|---|---|---|---|---|---|
| | | 1 | 2 | 3 | 4 | 5 | 6 | 7 | 8 | 9 |
| Core | BD[1] | 70 | 70 | 70 | 70 | 70 | 70 | 70 | 70 | 70 |
| | SM[2] | 30 | 30 | 30 | 30 | 30 | 30 | 30 | 30 | 30 |
| | JWEB50[3] | — | 1.0 | — | 1.0 | 2.5 | — | 1.0 | 1.0 | 1.0 |
| | 101[4] | — | — | — | — | — | — | — | — | — |
| Core-shell copolymer | Core | 70 | 70 | 70 | 70 | 70 | 75 | 70 | 70 | 70 |
| | MMA[5] | 15 | 15 | 15 | 15 | 15 | 12.5 | 15 | 15 | 15 |
| | SM[2] | 15 | 15 | 15 | 15 | 15 | 12.5 | 15 | 15 | 15 |
| | SAM[6] | — | — | 1.5 | 3.5 | 1.5 | — | 1.5 | 1.5 | 1.5 |
| Impact strength | (rpm) | 750 | 755 | 770 | 800 | 700 | 800 | 650 | 750 | 750 |
| Transmittance | (%) | 87 | 88 | 88 | 83 | 88 | 85 | 88 | 89 | 83 |
| Haze | (%) | 34.0 | 23.0 | 33.0 | 32.0 | 22.0 | 37.0 | 19 | 30 | 25 |
| Thermal stability | $\Delta YI$ | 35 | 32 | 18 | 14 | 17 | 38 | 14 | 15 | 17 |

[1] BD: 1,3-butadiene (% by weight)
[2] SM: styrene (% by weight)
[3] JWEB50: LUPEROX ® JWEB50 (parts by weight)
[4] 101: LUPEROX ® 101 (parts by weight)
[5] MMA: methyl methacrylate
[6] SAM: silicon azo-based macro initiator As shown in Tables 1 and 2 above, it was confirmed that in the resin composition specimen using the core-shell copolymers of Examples 1 to 7 according to the present disclosure as an impact modifier, the impact strength, the haze property, and the thermal stability were excellent, as compared with Comparative Example 1 where in the preparation of the core, the initiator including two or more peroxide-based functional groups was not added, and in the preparation of the core-shell copolymer, the macro initiator was not added.

On the other hand, it was confirmed that in the case of Comparative Example 2 where in the preparation of the core, the initiator including two or more peroxide-based functional groups was added, but in the preparation of the core-shell copolymer, the macro initiator was not added, the impact strength and the thermal stability were poor; and in the case of Comparative Example 3 where in the preparation of the core, the initiator including two or more peroxide-based functional groups was not added, the impact strength and the haze property were poor.

In addition, it was confirmed that in the case of Comparative Example 4 where the macro initiator was excessively added, the haze property was slightly improved; and in the case of Comparative Example 5 where the initiator including two or more peroxide-based functional groups was excessively added, the impact strength was slightly improved.

In addition, it was confirmed that in the case of Comparative Example 6 where the contents of the core and the shell of the core-shell copolymer were partially adjusted, the impact strength seemed to be improved somewhat due to the increase in the content of the core, but the haze property and the thermal stability were abruptly deteriorated due to the reduction in the content of the shell.

In addition, even though the initiator including two or more peroxide-based functional groups is added, it was confirmed that in the case of Comparative Example 7 where the initiator including two or more peroxide-based functional groups was added when a polymerization conversion ratio is 70%, the initiator including two or more peroxide-based functional groups participated in the polymerization reaction to form repeating units in the core, not a linking group, such that the impact strength was deteriorated; and in the case of Comparative Example 8 where the initiator including two or more peroxide-based functional groups was added when a polymerization conversion ratio is 100%, after the completion of the polymerization, the impact strength and the haze property were not improved.

In addition, even though the macro initiator is added, it was confirmed that in the case of Comparative Example 9 where the macro initiator having a very high weight average molecular weight was added, the block of the macro initiator-derived linking group formed in the shell was very large, such that the impact strength and the haze property were very slightly improved.

From the above results, the present inventors confirmed that when the core-shell copolymer prepared according to the present disclosure was used as the impact modifier of the vinyl chloride polymer, both of the impact strength and the haze property could be improved and thermal stability was excellent.

When using the core-shell copolymer prepared by the method for preparing a core-shell copolymer according to the present disclosure as an impact modifier for a vinyl chloride polymer, both of an impact strength and a haze property, which are in a trade-off relationship, are improved, and thermal stability is excellent.

What is claimed is:

1. A method for preparing a core-shell copolymer, comprising:
    preparing a core by polymerizing a conjugated diene-based monomer and adding an initiator including two or more peroxide-based functional groups when a polymerization conversion ratio is 95% or more and less than 100%; and
    preparing a core-shell copolymer by polymerizing an alkyl (meth)acrylate monomer in the presence of the core and a macro initiator having a weight average molecular weight of 4,000 g/mol to 50,000 g/mol,
    wherein the initiator including two or more peroxide-based functional groups is added in an amount of more than 0 parts by weight and less than 2.5 parts by weight based on 100 parts by weight of the conjugated diene-based monomer, and
    the macro initiator is added in an amount of more than 0 parts by weight and less than 3.5 parts by weight based on 100 parts by weight of the alkyl (meth)acrylate monomer.

2. The method of claim 1, wherein the peroxide-based functional groups of the initiator are each independently an alkyl group having a tertiary carbon atom, a cycloalkyl group, an alkenyl group, an alkynyl group or an aryl group.

3. The method of claim 1, wherein the initiator including two or more peroxide-based functional groups is an initiator including two to four peroxide-based functional groups.

4. The method of claim 1, wherein the initiator including two or more peroxide-based functional groups is added when a polymerization conversion ratio is from 95% to 97%.

5. The method of claim 1, wherein the initiator including two or more peroxide-based functional groups is added in an amount of more than 0 parts by weight and equal to or less than 2 parts by weight based on 100 parts by weight of the conjugated diene-based monomer.

6. The method of claim 1, wherein the macro initiator has a weight average molecular weight of 10,000 g/mol to 40,000 g/mol.

7. The method of claim 1, wherein the macro initiator is a silicon azo-based macro initiator.

8. The method of claim 7, wherein the macro initiator is represented by the following Chemical Formula 1:

[Chemical Formula 1]

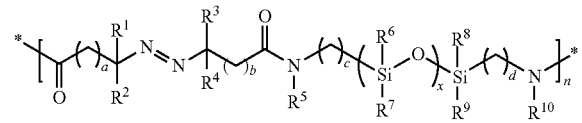

wherein
    $R^1$ to $R^4$, and $R^6$ to $R^9$ are each independently an alkyl group having 1 to 10 carbon atoms, or a cyano group,
    $R^5$ and $R^{10}$ are each independently hydrogen or an alkyl group having 1 to 10 carbon atoms,
    a, b, c and d are each independently an integer selected from 1 to 10,
    x is an integer selected from 10 to 1000,
    n is an integer selected from 1 to 30, and
    * is a bonding position between repeating units, but is hydrogen at a terminal.

9. The method of claim 1, wherein the macro initiator is added in an amount of more than 0 parts by weight and equal to or less than 3 parts by weight, based on 100 parts by weight of the alkyl (meth)acrylate monomer.

10. The method of claim 1, wherein the polymerization in the preparing of the core and the preparing of the core-shell copolymer each independently is carried out by further including an aromatic vinyl monomer.

11. The method of claim 1, wherein the core-shell copolymer prepared in the preparing of the core-shell copolymer includes 50% by weight to 90% by weight of core and 10% by weight to 50% by weight of the shell.

\* \* \* \* \*